US010586447B2

(12) United States Patent
Astigarraga et al.

(10) Patent No.: US 10,586,447 B2
(45) Date of Patent: Mar. 10, 2020

(54) SMART TRAFFIC SIGNAL METHODS AND SYSTEMS

(71) Applicant: International Business Machines Corporation, Armonk, NY (US)

(72) Inventors: Tara Astigarraga, Fairport, NY (US); Christopher V. DeRobertis, Hopewell Junction, NY (US); Itzhack Goldberg, Hadera (IL); Jose R. Mosqueda Mejia, Jalisco (MX); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/659,317

(22) Filed: Jul. 25, 2017

(65) Prior Publication Data
US 2019/0035270 A1 Jan. 31, 2019

(51) Int. Cl.
G08G 1/0967 (2006.01)
G08G 1/08 (2006.01)
G08G 1/087 (2006.01)
G08G 1/052 (2006.01)

(52) U.S. Cl.
CPC ....... *G08G 1/096716* (2013.01); *G08G 1/052* (2013.01); *G08G 1/08* (2013.01); *G08G 1/087* (2013.01); *G08G 1/096758* (2013.01); *G08G 1/096783* (2013.01); *B60W 2550/30* (2013.01); *B60W 2550/308* (2013.01)

(58) Field of Classification Search
None
See application file for complete search history.

(56) References Cited

U.S. PATENT DOCUMENTS

| 5,801,943 | A | 9/1998 | Nasburg |
| 6,405,132 | B1 * | 6/2002 | Breed ................ B60N 2/002 |
| | | | 701/117 |
| 7,920,959 | B1 | 4/2011 | Williams |
| 2009/0256723 | A1 | 10/2009 | Peddie et al. |

(Continued)

FOREIGN PATENT DOCUMENTS

| WO | 2014/071222 A1 | 5/2014 |
| WO | 2016/192767 A1 | 12/2016 |
| WO | 2017/021767 A1 | 2/2017 |

OTHER PUBLICATIONS

Rebecca Boyle "Algorithm Can Detect When Cars Are About to Run a Red Light", Popular Science, Nov. 30, 2011, 1 page.

(Continued)

*Primary Examiner* — Nay Tun
*Assistant Examiner* — Shawna M Kingston
(74) *Attorney, Agent, or Firm* — Kunzler Bean & Adamson

(57) ABSTRACT

Smart traffic signal methods are provided. One method includes determining a stopping distance for a vehicle approaching a geographic location and, in response to determining the stopping distance, determining whether the first vehicle will stop prior to reaching the geographic location. The method further includes, in response to determining that the vehicle will not stop prior to reaching the geographic location, modifying a signal of a traffic light located at the geographic location. Systems and computer program products for performing the above method are also provided.

20 Claims, 7 Drawing Sheets

(56) References Cited

U.S. PATENT DOCUMENTS

| | | | |
|---|---|---|---|
| 2013/0116915 A1* | 5/2013 | Ferreira | G08G 1/163 |
| | | | 701/117 |
| 2014/0278029 A1* | 9/2014 | Tonguz | G08G 1/161 |
| | | | 701/117 |
| 2016/0027299 A1* | 1/2016 | Raamot | G08G 1/08 |
| | | | 340/917 |
| 2016/0286026 A1 | 9/2016 | Lord et al. | |
| 2016/0379490 A1 | 12/2016 | Simanowski et al. | |
| 2017/0220691 A1* | 8/2017 | Oulmane | G06F 17/30339 |

OTHER PUBLICATIONS

Virgina Tech, "Length of Yellow Caution Traffic Lights Could Prevent Accidents", Newswise, Sep. 11, 2012, 4 pages.

Wikipedia, Smart Traffice Light, Wikipedia, the free encyclopedia, last edited Sep. 16, 2016, downloaded Jul. 20, 2017, 3 pages.

US Department of Transportation, "Next-Generation Smart Traffic Signals", https://www.fhwa.dot.gov/advancedresearch/pubs/SmartTrafficSignal.pdf, know about as early as Jul. 5, 2017, downloaded Jul. 20, 2017, 2 pages.

American Technion Society, "'Smart' Traffic Sign Stops Collisions", Science News, Jul. 30, 2007, 1 page.

Marish Hicks, "State Police Investigating Speed Trap Allegations in Damascus", TheCabin.net, Jun. 24, 2016, 4 pages.

Mike Masnick, "UK Man Convicted of a Crime for Letting Drivers Know They Should Slow Down to Avoid Speed camera", Techdirt, Jan. 6, 2011, 1 page.

H.X. Liu et al., "Smart-Signal: Systematic Monitoring of Arterial Road Traffic Signals", Proceedings of the 11th International IEEE Conference on Intelligent Transportation Systems, Oct. 12-15, 2008, 6 pages.

\* cited by examiner

SMART TRAFFIC SIGNAL METHODS AND SYSTEMS

FIELD

The subject matter disclosed herein relates to traffic signals and, more particularly, relates to smart traffic signal methods and systems.

BACKGROUND

Speed and/or red-light cameras located at roadway traffic intersections are typically passive devices that can detect and identify vehicles operating at excessive speeds and/or running red lights. That is, conventional speed/red-light cameras can detect/identify violations, but themselves, do little to reduce or prevent accidents resulting from such speed and red-light violations. As such, it is left up to individuals to avoid being in an accident at a traffic intersection.

BRIEF SUMMARY

Smart traffic signal methods and systems are provided. One method includes determining, by a processor, a stopping distance for a vehicle approaching a geographic location and, in response to determining the stopping distance, determining whether the vehicle will stop prior to reaching the geographic location. The method further includes, in response to determining that the vehicle will not stop prior to reaching the geographic location, modifying a signal of a traffic light located at the geographic location.

A smart traffic system includes a stopping distance module that determines a stopping distance for a first vehicle approaching a geographic location and a determination module that, in response to determining the stopping distance, determines whether the first vehicle will stop prior to reaching the geographic location. The system further includes a signal module that, in response to determining that the first vehicle will not stop prior to reaching the geographic location, modifies a signal of a traffic light located at the geographic location.

Also disclosed are computer program products comprising a computer-readable storage medium including program instructions embodied therewith that provide a smart traffic signal. Some program instructions are executable by a processor and cause the processor to determine a stopping distance for a vehicle approaching a geographic location and, in response to determining the stopping distance, determine whether the vehicle will stop prior to reaching the geographic location. The program instructions further cause the processor to, in response to determining that the vehicle will not stop prior to reaching the geographic location, modify a signal of a traffic light located at the geographic location.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
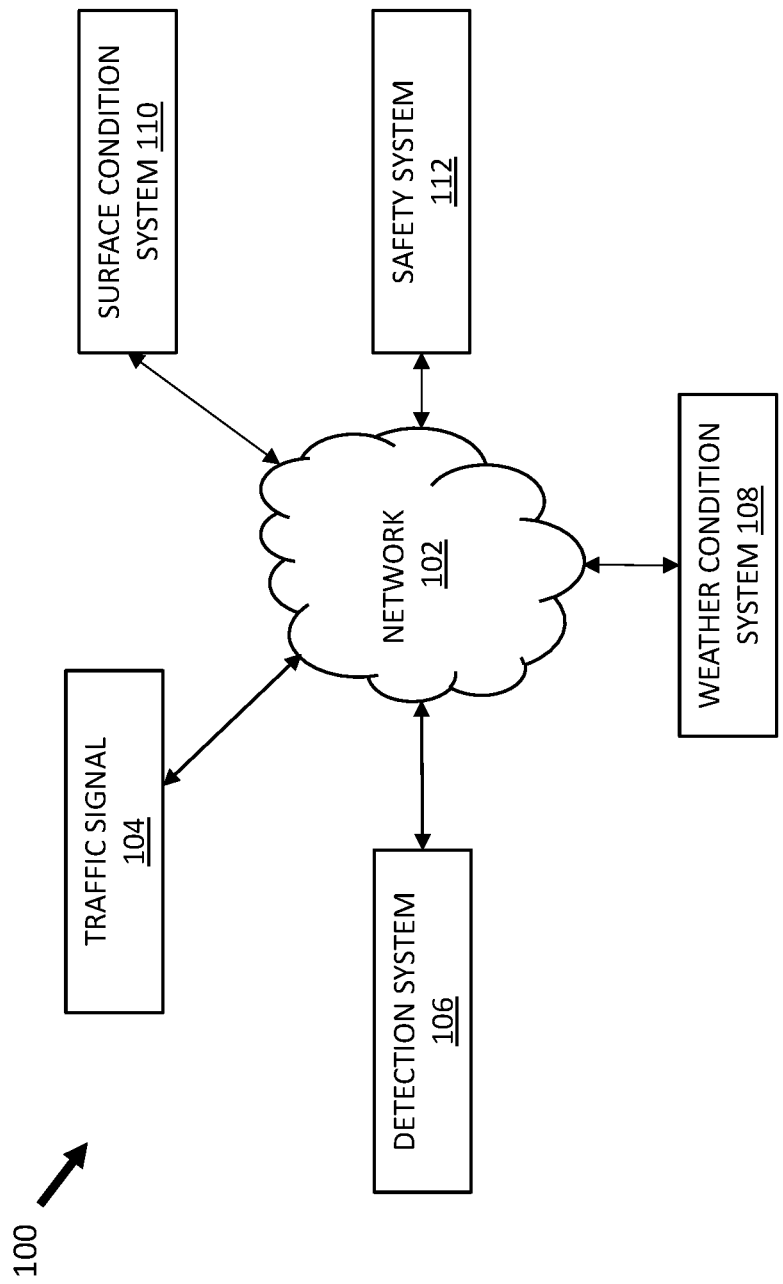
FIG. 1 is a block diagram illustrating one embodiment of a smart traffic signal system.

Disclosed herein are various embodiments providing methods, systems, and computer program products that copy data to auxiliary storage arrays co-located with primary storage arrays from mirrored storage. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Smart traffic signal methods and systems are described herein. One method includes determining, by a processor, a stopping distance for a first vehicle approaching a geographic location and, in response to determining the stopping distance, determining whether the first vehicle will stop prior to reaching the geographic location. The method further includes, in response to determining that the first vehicle will not stop prior to reaching the geographic location, modifying a signal of a traffic light located at the geographic location.

In some embodiments, determining the stopping distance includes detecting a velocity of the first vehicle and/or identifying a vehicle type for the first vehicle. Here, the stopping distance can be determined based on the velocity and/or the vehicle type.

In further embodiments, determining the stopping distance includes detecting a velocity of the first vehicle and/or detecting at least one of a weather condition and a road condition at the geographic location. Here, the stopping distance can be determined based on the velocity, weather condition, and/or road condition.

Modifying the signal, in some embodiments, may include increasing a stop time for a stop light for a second vehicle oriented in a different direction than the first vehicle at the geographic location, increasing a go time go light for the first vehicle, providing a warning to the second vehicle, and/or providing a warning to a pedestrian at the geographic location. Here, the modification may be performed in response to determining that the first vehicle will not stop prior to reaching the geographic location.

A smart traffic system includes a stopping distance module that determines a stopping distance for a first vehicle approaching a geographic location and a determination module that, in response to determining the stopping distance, determines whether the first vehicle will stop prior to reaching the geographic location. The system further includes a signal module that, in response to determining that the first vehicle will not stop prior to reaching the geographic location, modifies a signal of a traffic light located at the geographic location.

In some embodiments, the stopping distance module includes a velocity module that detects a velocity of the first vehicle. Here, the stopping distance can be determined based on the velocity of the first vehicle.

In various embodiments, the stopping distance module includes a velocity module that detects a velocity of the first vehicle and an identification module that identifies a vehicle type for the first vehicle and can determine the stopping distance based on the velocity and the type of vehicle. In some embodiments, the identification module further identifies the make, model, and/or year of the vehicle and the stopping distance is further determined based on the make, model, and/or the year of the vehicle.

In additional or alternative embodiments, the system includes a lookup table including a grid of stopping distances based on velocities for a plurality of vehicles including the make, model, and/or year of the vehicle. In some embodiments, the stopping distance can be determined based on cross-referencing the velocity and the first vehicle on the grid.

In further additional or alternative embodiments, the system includes a lookup table including a grid of stopping distances based on velocities for a plurality of vehicle types. In some embodiments, the stopping distance can be determined based on cross-referencing the velocity and the first vehicle on the grid.

The system, in some embodiments, further includes a weather condition system that detects a weather condition and/or a surface condition system that detects a surface condition at the geographic location. Here, the stopping distance can be determined based on the velocity and the weather condition and/or the surface condition.

In various embodiments, a signal module modifies signal to increase a stop light for a second vehicle oriented in a different direction than the first vehicle at the geographic location and/or increase a go light for the first vehicle in response to determining that the first vehicle will not stop prior to reaching the geographic location. In some embodiments, the signal module modifies the signal to indicate to a second vehicle oriented in a different direction than the first vehicle at the geographic location to stop or accelerate in response to determining that the first vehicle will not stop prior to reaching the geographic location.

In additional or alternative embodiments, the signal module modifies the signal to provide a first warning to a second vehicle at the geographic location in response to determining that the first vehicle will not stop prior to reaching the geographic location. The signal module may further modify the signal to provide a second warning to the second vehicle in further response to determining that the first vehicle will not stop prior to reaching the geographic location.

Also disclosed are computer program products comprising a computer-readable storage medium including program instructions embodied therewith that provide a smart traffic signal. Some program instructions are executable by a processor and cause the processor to determine a stopping distance for a vehicle approaching a geographic location and, in response to determining the stopping distance, determine whether the vehicle will stop prior to reaching the geographic location. The program instructions further cause the processor to, in response to determining that the vehicle will not stop prior to reaching the geographic location, modify a signal of a traffic light located at the geographic location.

In some embodiments, the program instructions that cause the processor to determine the stopping distance include program instructions that further cause the processor to detecting a velocity of the first vehicle and/or identify a vehicle type for the first vehicle. Here, the stopping distance can be determined based on the velocity and/or the vehicle type.

In further embodiments, the program instructions that cause the processor to determine the stopping distance include program instructions that further cause the processor to detect a velocity of the first vehicle and/or detect at least one of a weather condition and a road condition at the geographic location. Here, the stopping distance can be determined based on the velocity, weather condition, and/or road condition.

The program instructions that cause the processor to modify the signal, in some embodiments, may include program instructions that further cause the processor to increase a stop time for a stop light for a second vehicle oriented in a different direction than the first vehicle at the geographic location, increase a go time go light for the first vehicle, provide a warning to the second vehicle, and/or provide a warning to a pedestrian at the geographic location. Here, the modification may be performed in response to determining that the first vehicle will not stop prior to reaching the geographic location.

With reference now to the figures, FIG. 1 is a block diagram illustrating one embodiment of a smart traffic signal system 100 (also simply referred to as system 100). At least in the illustrated embodiment, the system 100 includes, among other components, a network 102 coupling a traffic signal 104, a detection system 106, a weather condition system 108, a surface condition system 110, and/or a safety system 112 to one another.

The network 102 may be any suitable wired and/or wireless network 102 (e.g., public and/or private computer networks in any number and/or configuration (e.g., the Internet, an intranet, a cloud network, etc.)) that is known or developed in the future. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

The traffic signal 104 may include any suitable type of signal that is known or developed in the future that can control the flow of vehicle traffic and/or pedestrian traffic. In various embodiments, a signal may include one or more visual cues and/or auditory cues oriented in one or more directions that provide traffic control to vehicles and/or pedestrians at a geographic location (e.g., roadways (e.g., a traffic intersection, a parking lot, a freeway, a highway, a turnpike, a road, a railroad crossing, a bridge, etc.), a railway (e.g., a railroad crossing, a rail yard, a rail line, etc.), an airway (e.g., an airport runway, taxiway, etc.), and/or waterway (e.g., a port, a harbor, a body of water, etc.).

In some embodiments, the traffic signal 104 may include one or more sets of visual cues and/or auditory cues oriented in one or more directions and that include one or more operational modes. The visual cue(s) and/or auditory cue(s) may be any suitable visual cue and/or auditory cue that is known or developed in the future that can assist in navigating a vehicle and/or a person through a geographic location.

For example, a traffic signal 104 may include a set of stop lights (e.g., red light(s)), caution lights (e.g., amber light(s)), and/or go lights (e.g., green light(s)) that can be OFF, ON (e.g., solidly lit, display one or more intensities, and/or display one or more colors, etc.), and/or flash, among other quantities, colors, and/or operational modes that are possible and contemplated herein.

Additionally, or alternatively, a traffic signal 104 may include a set of directional lights (e.g., red arrow(s), amber arrow(s), and/or green arrow(s)) that can be OFF, ON (e.g., solidly lit, display one or more intensities, and/or display one or more colors, etc.), and/or flash, among other quantities, colors, operational modes, and/or directional indicators that are possible and contemplated herein. The arrow(s) can be, for example, a turning arrow, a straight arrow, a U-turn arrow, and/or other suitable type of directional arrow and/or directional indicator.

Further additionally, or alternatively, a traffic signal 104 may include a set of auditory cues. An auditory cue may include any suitable sound and/or noise that can assist an operator in navigating a vehicle through a geographic location. Example auditory cues may include, but are not limited to, a verbal command/instruction, a set of sounds/noises (e.g., "beeps," "chirps," and/or "buzzes," etc.), noises/sounds including different frequencies, noises/sounds including different pitches, noises/sounds including different volumes, a pattern of noises/sounds, and/or music, etc., among other types of auditory cues that are possible and contemplated herein.

In one or more additional or alternative examples, the traffic signal 104 may include a set of visual cues and/or a set of auditory cues for pedestrians. The visual cue(s) and/or auditory cue(s) may be any suitable visual and/or auditory cue that is known or developed in the future that can assist a pedestrian in navigating through and/or to a geographic location. For example, a visual cue may include one or more lights that can alternate colors (e.g., red (stop) and green (go)) and/or alpha-numeric characters (e.g., "DON'T WALK," "WALK," a warning ("STOP," "RUN," etc.), and/or a numeric countdown, etc.), among other visual cues that are possible and contemplated herein. An auditory cue for a pedestrian may include any of the auditory cues discussed elsewhere herein.

A traffic signal 104 may include a set of signals for each direction of traffic at a geographic location. For example, at a roadway four-way intersection, a traffic signal 104 may include a set of lights (e.g., a red light, an amber light, and a green light) oriented in each of the four directions for vehicle traffic. Additionally, or alternatively, the traffic signal 104 may include a set of signals (e.g., visual cues (lights) and/or auditory cues (sounds)) oriented in each direction for pedestrian traffic, which can include up to six directions (e.g., North (N), South (S), East (E), West (W), and two diagonals (NW-SE and NE-SW). Further additionally, or alternatively, traffic signal 104 may transmit wireless signals to smart cars, smart trucks, and/or smart buses regarding, for example, roadway intersections.

At a railroad crossing, a traffic signal 104 may include a set of lights oriented in one or more directions of vehicle traffic and/or pedestrian traffic. For example, the traffic signal 104 may include one or more sets of signals for roadway traffic (e.g., automobiles, trucks, motorcycles, bicycles, buses, etc.), one or more sets of signals for railway traffic (e.g., trains, trolleys, monorails, etc.), and/or one or more sets of signals for pedestrian traffic.

Additionally, or alternatively, a traffic signal 104 may transmit wireless signals to smart cars, smart trucks, and/or smart buses regarding, for example, railway and/or railroad crossings. Further additionally, or alternatively, a traffic signal 104 may transmit wireless signals to smart trains, to help avert train-vehicle collisions when a vehicle is, for example, disabled at a railroad crossing.

Similarly, a traffic signal 104 at a drawbridge may include a set of lights oriented in one or more directions of vehicle traffic and/or pedestrian traffic. For example, the traffic signal 104 may include one or more sets of signals for roadway traffic crossing over the bridge, one or more sets of signals for maritime traffic (e.g., ships, boats, barges, etc.) or railway traffic crossing under the drawbridge, and/or one or more sets of signals for pedestrian traffic crossing over the drawbridge. Additionally, or alternatively, traffic signal 104 may transmit wireless signals to smart cars, smart trucks, and/or smart buses regarding, for example, drawbridges.

Further, a traffic signal 104 at an airport runway may be configured similar to that of a roadway for aircraft during taxiing operations. Other traffic signals 104 at an airport may include visual cues and/or auditory cues for managing aircraft that are on the ground and/or in the air. For example, a traffic signal 104 may include one or more sets of signals oriented in one or two dimensions (e.g., on an X-axis and/or a Y-axis (two-dimensional (2-D) plane)) to manage aircraft that are on the ground and/or one or more sets of signals oriented in up to three dimensions (e.g., on an X-axis, a Y-axis, and/or a Z-axis (three-dimensional (3-D) plane)) to manage aircraft that are in the air. Additionally, or alternatively, traffic signal 104 may transmit wireless signals to smart aircraft.

In addition, a traffic signal 104 on, for example, a body of water (e.g., a port/harbor, an ocean, a sea, a lake, a river, etc.) or at other geographic area including less defined traffic routes may include one or more signals oriented along a circular axis (e.g., up to about three hundred sixty degrees (360°)). For example, a traffic signal 104 may include four sets of signals in which each set of signals is oriented on a different ninety-degree (90°) arc to manage traffic in all directions of a 2-D plane, among other signal quantities and/or arc degrees that are possible and contemplated herein. Additionally, or alternatively, traffic signal 104 may transmit wireless signals to smart boats, smart ships, and/or other smart watercraft.

A detection system 106 may include any suitable device and/or system that can detect one or more vehicles approaching a geographic location, the distance(s) the vehicle(s) is/are away from the geographic location, and/or measure the velocity or speed of the vehicle(s) as it/they approach the geographic location. Examples of suitable devices/systems include, but are not limited to, a camera (e.g., video, photo, infrared, etc.), radio detection and ranging (RADAR), light amplification by stimulated emission of radiation (LASER), light detection and ranging (LIDAR), and/or sound navigation and ranging (SONAR), etc., among other devices/systems and/or techniques that are possible and contemplated herein.

A weather condition system 108 may include any suitable device and/or system that can detect and/or receive one or more weather conditions. Examples of suitable devices/systems include, but are not limited to, a camera, RADAR, LASER, LIDAR, and/or SONAR, etc., among other devices/systems and/or techniques that are possible and contemplated herein. In various embodiments, a weather condition system 108 can detect precipitation (e.g., ran, snow, ice, etc.), wind, temperature, humidity, barometric pressure, dust, and/or fog, etc., among other weather conditions that are possible and contemplated herein.

A weather condition system 108 may receive weather conditions from one or more external sources. In some embodiments, a weather condition system 108 may receive weather conditions from an Internet website (e.g., www.weather.com) and/or other type of network and/or source including weather information.

A surface condition system 110 may include any suitable device and/or system that can detect one or more conditions on a surface (e.g., a road, bridge, marine, tracks, etc.) that can be used by a vehicle. Examples of suitable devices/systems include, but are not limited to, a camera, RADAR, LASER, LIDAR, and/or SONAR, etc., among other devices/systems and/or techniques that are possible and contemplated herein. In various embodiments, a surface condition system can detect the presence of water, snow, ice, foreign substances (e.g., liquids, rocks, dirt, sand, etc.), construction, smoothness/roughness, and/or texture (e.g., concrete, asphalt, dirt, cobblestone, brick, water, etc.), among other surface conditions that may increase a stopping distance that are possible and contemplated herein.

A safety system 112 may include any suitable hardware and/or software that can determine whether one or more vehicles approaching a geographic location can stop prior to reaching the geographic location based on one or more inputs received from the detection system 106, weather condition system 108, and/or surface condition system 110. Further, the hardware and/or software of the safety system 112 can further modify a signal displayed on and/or generate a signal for display on the traffic signal 104 in response to determining that the vehicle(s) will not stop prior to reaching the geographic location.

While FIG. 1 illustrates the detection system 106, weather condition system 108, surface condition system 110, and safety system 112 as different systems, various embodiments of the traffic signal system 100 may combine two or more of the detection system 106, weather condition system 108, surface condition system 110, and safety system 112 into one or more systems. That is, a system may include two or more of the detection system 106, weather condition system 108, surface condition system 110, and safety system 112 as subsystems. For instance, a camera may include the capabilities and/or functions of the detection system 106, weather condition system 108, and surface condition system 110.

Figure 2:
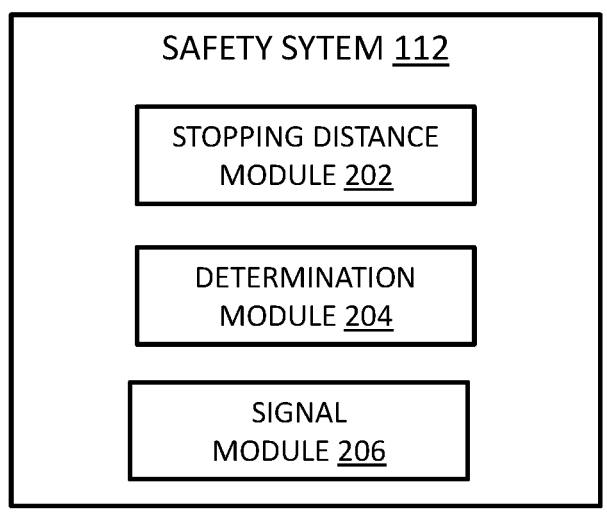
FIG. 2 is a block diagram illustrating one embodiment of a safety system included in the smart traffic signal system of FIG. 1.

With reference to FIG. 2, FIG. 2 is a block diagram illustrating one embodiment of a safety system 112. In various embodiments, a safety system 112 can be, include, and/or form a portion of a processor or processing device of a computer and/or computing system. At least in the illustrated embodiment, the safety system 112 includes, among other components, a stopping distance module 202, a determination module 204, and a signal module 206.

A stopping distance module 202 may include any suitable hardware and/or software that can determine and/or estimate the amount of distance it will take a vehicle to stop (simply referred to herein as the stopping distance). In various embodiments, the stopping distance can be determined based on the velocity or speed at which the vehicle is traveling (e.g. $KE=\frac{1}{2}mv^2$). Further, a stopping module 202 may include a base or general range of stopping distance for vehicles that typically use the geographic location where the system 100 is located and the range of stopping distances may be based on various velocities/speeds of such vehicles.

In general, the higher the velocity/speed of a vehicle, the greater the stopping distance will be.

In further embodiments, the stopping distance can be determined based on a combination of the velocity/speed of the vehicle and one or more factors. That is, a base stopping distance for a particular velocity/speed may be increased depending on one or more factors that may exist at the time a vehicle is approaching a geographic location.

Factors that can increase the estimated stopping distance include, but are not limited to, weather conditions and/or surface conditions, etc., among other factors that are possible and contemplated herein. For instance, the estimated stopping distance of an automobile traveling at a particular velocity/speed may be increased in response to determining/detecting precipitation in the environment surrounding the geographic location where the system 100 is located. Similarly, the estimated stopping distance of an automobile traveling at a particular velocity/speed may be increased in response to determining/detecting water, snow, and/or ice on a roadway or intersection where the system 100 is located.

Figure 3:
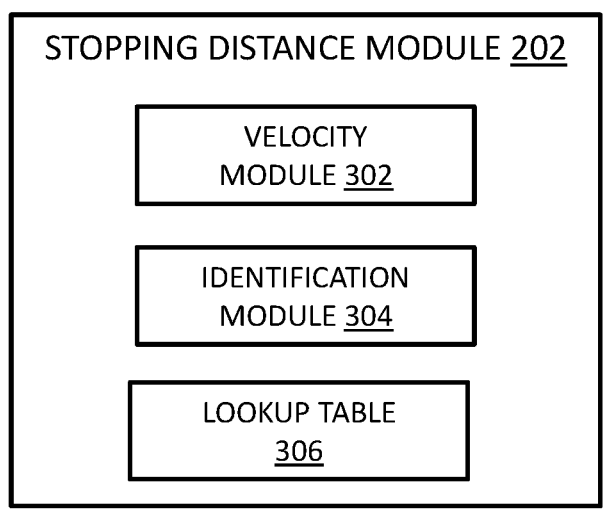
FIG. 3 is a block diagram of one embodiment of a stopping distance module included in the safety system of FIG. 3.

With reference now to FIG. 3, FIG. 3 is a block diagram of one embodiment of a stopping distance module 202. At least in the illustrated embodiment, the stopping distance module 202 includes, among other components, a velocity module 302, an identification module 304, and a look-up table 306. A velocity module 302 may include any suitable hardware and/or software that can determine the velocity of a vehicle based on one or more inputs (e.g., from detection system 106). In various embodiments, the velocity module 302 may receive a calculated velocity of a vehicle directly from the detection system 106 and/or the velocity module 302 may calculate the vehicle velocity based on raw data received from the detection system 106. The velocity module 302 may use any suitable algorithm and/or function that is/are known or developed in the future to calculate the velocity based on the raw data received from the detection system 106 including, but not limited, to either change in distance divided by change in time or Doppler-shift of the signal. Further, a velocity module 302 may query an approaching smart vehicle (e.g., smart car, smart truck, smart bus, smart aircraft, smart watercraft, smart railway vehicle, etc.) to obtain the velocity of the smart vehicle from the smart vehicle itself.

An identification module 304 may include any suitable hardware and/or software that can identify a vehicle based on one or more inputs (e.g., from detection system 106). In various embodiments, an identification module 304 can identify and/or differentiate between various types of vehicles.

For example, the identification module 304 can identify/distinguish automobiles, trucks, busses, motorcycles, and/or bicycles, etc. on a roadway. In another example, the identification module 304 can identify/distinguish ships, boats, sailboats, jet skis, and/or wave runners, etc. in a port. In yet another example, the identification module 304 can identify/distinguish jet planes, propeller-driven aircraft, helicopters, and/or gliders, etc. on a taxi way of an airport. In still another example, the identification module 304 can identify/distinguish passenger trains, cargo trains, bullet trains, and/or trolleys, etc. in a rail yard.

The above examples are for instructional purposes and/or ease in understanding the functionality and/or capabilities of an identification module 304. That is, there are numerous possible variations of the above examples that are not specifically discussed; however, each such variation is contemplated herein. Accordingly, the above examples are not intended to, nor should they, limit the scope of the invention in any manner.

In some embodiments, the identification module 304 can identify specific vehicles. For instance, the identification module 304 can identify the year, make, and/or module of a vehicle, especially vehicles that are typically utilized on roadways.

A lookup table 306 may include any suitable hardware and/or software that can store data, which can include a database. A lookup table 306, in some embodiments, includes the stopping distances for one or more vehicles corresponding to various velocities for the vehicle(s).

The vehicles included in a lookup table 306 may be categorized in any suitable manner including, for example, vehicle type (e.g., truck, bus, automobile, motorcycle, bicycle, etc.), specific vehicle (e.g., particular year(s), make(s), and/or model(s), etc.), vehicle mass/weight, vehicle class (e.g., commercial, passenger, etc.), and/or vehicle age, etc., among other possible characteristics that may affect the stopping distance of the vehicle, each of which is contemplated herein.

For instance, a lookup table 306 may include the stopping distances corresponding to various velocities for a number of model years for a particular automobile. In a specific non-limiting example, the stopping distances for the model years 2000-2017 of a BMW M3 for various velocities or ranges of velocities may be included in a lookup table 306.

In some embodiments, the lookup table 306 may include a grid that can be cross-referenced to determine an estimated stopping distance. In continuing the above example for the BMW M3, a first axis may include the model years 2000 through 2017 and a second axis may include individual velocities (e.g., 20 miles-per-hour (MPH) through 100 MPH, among other possible ranges) or ranges of velocities (e.g., 20-29 mph, 30-39 MPH, 40-49 MPH . . . 90-100 MPH, among other possible ranges and/or range sizes).

By cross-referencing the model year and a detected/determined velocity, the stopping distance of a vehicle (a BMW M3 in this example) can be estimated/determined, which can be increased based on one or more factors as discussed elsewhere herein. For instance, the stopping distance of a 2010 BMW M3 traveling at 37 MPH as it approaches an intersection with a dry surface on a sunny day can be estimated/determined utilizing a lookup table 306, which may be different (e.g., less) than on a rainy and/or on a wet surface.

The lookup table 306 may be populated with stopping distances acquired from a vehicle manufacturer and/or an independent testing entity. In some embodiments, the lookup table 306 can be populated with stopping distances observed by the system 100 over a period of time for one or more vehicles and/or vehicle types.

With reference again to FIG. 2, a determination module 204 can include any suitable hardware and/or software than can determine whether a vehicle approaching a geographic location can stop prior to reaching the geographic location. The determination may be based on a combination of the velocity of the vehicle at one or more locations/points prior to the geographic location for a particular direction, which can be termed reference points and/or way points, and the stopping distance for the vehicle at the detected velocity (and, optionally, in consideration of one or more weather and/or surface factors that may increase the stopping distance).

A geographic location may include any suitable quantity of reference/way points that can allow a determination module 204 to determine whether a vehicle traveling at a detected velocity (and, optionally, in consideration of one or more weather and/or surface factors) can stop prior to reaching the geographic location. Further, the reference/way point(s) may be located at any suitable distance prior to the geographic location with respect to a particular direction that can allow a determination module 204 to determine whether a vehicle traveling at a detected velocity (and, optionally, in consideration of one or more weather and/or surface factors) can stop prior to reaching the geographic location.

For instance, a determination module 204 may determine that an automobile may not be able to stop prior to reaching a roadway intersection in response to the stopping distance for the automobile traveling at the detected velocity being greater than the distance between the roadway intersection and the reference point where the velocity of the vehicle was detected/determined. Conversely, a determination module 204 may determine that the automobile is able to stop prior to reaching the roadway intersection in response to the stopping distance being less than the distance between the roadway intersection and the reference point.

A signal module 206 may include any suitable hardware and/or software that can control and/or modify signals (e.g., visual cues and/or auditory cues, etc.) of a traffic signal 104. In various embodiments, a signal module 206 may modify a signal displayed on and/or display a signal on a traffic signal in response to a determination operation performed by a determination module 204.

For instance, a signal module 206 may modify and/or display a signal on a traffic signal 104 in response to a determination module 204 determining that a vehicle will not stop prior to reaching a geographic location. Further, in response to a determination module 204 determining that the vehicle will stop prior to reaching the geographic location, the signal module 206 may not modify and/or display the signal on the traffic signal 104.

In various embodiments, a signal module 206 may lengthen the time that visual cue is displayed/ON in one or more sets of signals in response to a determination that a vehicle will not stop prior to reaching a geographic location. In other words, the stop-light change may be delayed. For example, the time that a stop-light (e.g., a red light) is displayed/ON (e.g., illuminated) at a roadway intersection in the direction(s) other than that of an approaching vehicle (e.g., a truck) may be increased in response to a determination that the truck will not stop prior to reaching the roadway intersection, which can be referred to as a smart red-light. In this manner, other vehicles that may be at the roadway intersection will have a prolonged red light when the truck is entering the roadway intersection (e.g., because it is not able to stop prior to entering the roadway intersection), which can assist in reducing situations in which the truck and one or more other vehicles are in the roadway intersection at the same time.

Additionally, or alternatively, the time that a go-light (e.g., a green light) is displayed/ON at the roadway intersection in the direction of the truck may be increased in response to the determination that the truck will not stop prior to reaching the roadway intersection. Here, the truck is less likely to encounter other vehicles in the intersection and/or perform maneuvers to avoid entering the roadway intersection on a stop-light.

Further additionally, or alternatively, the time that a stop-light (e.g., a red light) is displayed/ON on a pedestrian signal at the roadway intersection may be increased in response to the determination that the truck will not stop prior to reaching the roadway intersection. In this manner, one or more pedestrians that may be at the roadway intersection will have a prolonged red light, which can assist in reducing situations in which the truck and the pedestrian(s) are in the roadway intersection at the same time.

In additional or alternative embodiments, in response to determining that an approaching vehicle will not stop prior to reaching a roadway intersection and that one or more other vehicles in direction(s) other than the direction of the approaching vehicle have a go-light, a signal module 206 can provide a warning to the other vehicle(s) of the approaching vehicle. The warning may include any suitable visual cue(s) and/or suitable auditory cue(s) that can warn the vehicle operator(s) (or the vehicle in the case of a driverless vehicle) of the approaching vehicle.

In various embodiments, the visual cue(s) and/or auditory cue(s) may be an indication for the other vehicle(s) to stop (e.g., immediately) or accelerate (e.g., immediately). For example, the signal module 206 may turn ON (e.g., solidly or flashing) an amber light to provide the warning to the other vehicle(s), which can be called a smart amber light, among other types of visual cues and/or auditory cues that can warn one or more other vehicles that are possible and contemplated herein. Other examples may include a separate and/or specialized visual cue (e.g., a warning light) and/or auditory cue (e.g., warning sound) to provide the warning.

In various embodiments, a signal module 206 can provide a series of signals to warn vehicles that another vehicle is not going to stop before reaching a geographic location (e.g., is going to enter a roadway intersection). The series of signals can include any suitable combination of one or more visual cues and/or one or more auditory cues that can warn a vehicle operator (or vehicle).

In some embodiments, a first visual/auditory cue can provide a first warning to perform an action and a second visual/auditory cue can provide a first warning to perform a subsequent action. Example actions may include, but are not limited to, stopping, starting, decelerating, accelerating, and changing a course of direction (e.g., turning, reversing, ascending, descending, etc.), among other actions that are possible and contemplated herein.

For example, at a roadway intersection, a first visual cue (e.g., an amber light being solidly illuminated or being solidly illuminated with a go-light) may warn a vehicle operator (or vehicle) to accelerate and a second visual cue (e.g., a flashing amber light or flashing with a go-light) may warn a vehicle to subsequently change a course of direction (e.g., turn) or vice-versa (e.g., a flashing amber light switching to a solid amber light and/or warning the vehicle to turn and subsequently accelerate). While the above example explicitly describes a solid and flashing amber light, accelerating, and turning as visual cues and actions, there are numerous possible combinations of visual/auditory cues to warn a vehicle operator (or vehicle) and/or actions to perform in response thereto, each of which is contemplated herein.

In further additional or alternative embodiments, in response to determining that an approaching vehicle will not stop prior to reaching a roadway intersection and that one or more other vehicles at the roadway intersection will have a turn-light (e.g., a green arrow), which can be a right turn or a protected left turn, prior to the approaching vehicle reaching the roadway intersection, a signal module 206 can delay the turn-light until the vehicle clears the roadway intersection or some other point in time in which it is safe to enter the roadway intersection. This delayed turn-light can be referred to as a smart turn signal, a smart left-turn signal, or a smart right-turn signal.

In yet further additional or alternative embodiments, in response to determining that an approaching vehicle will not stop prior to reaching a roadway intersection and that one or more other vehicles at the roadway intersection have a turn-light, a signal module 206 can provide a warning to the turning vehicle(s) of the approaching vehicle. The warning may include any suitable visual cue(s) and/or suitable auditory cue(s) that can warn the turning vehicle operator(s) (or the turning vehicle) of the approaching vehicle. For instance, the turn-light can change (e.g., from red to green, from green to red, etc.), can include a different color (e.g., amber, etc.), and/or can change appearance (e.g., from solid to flashing, from flashing to solid, etc.), among other visual cues and/or auditory cues that are possible and contemplated herein.

In still further additional or alternative embodiments, in response to determining that one or more pedestrians is/are in a roadway intersection (e.g., a crosswalk, etc.), a signal module 206 can control all of the signals of a traffic signal 104 for vehicles to a stop-light (e.g., a red light). The stop signals may all remain illuminated until there are no more pedestrians present in the roadway intersection and/or until it is safe for vehicle traffic to enter the roadway intersection.

In some additional or alternative embodiments, in response to determining a weather condition and/or surface condition, a signal module 206 can control all of the signals of a traffic signal 104 for vehicles and/or pedestrians at a roadway intersection to a stop-light (e.g., a red light) for an extended and/or delayed amount of time, which can be referred to as smart extended signals and/or smart delayed signals. The signals may be extended and/or delayed for any suitable amount of time and/or until it is safe for vehicle traffic and/or pedestrian traffic to enter the roadway intersection.

In some embodiments, a system 100 and/or a traffic signal 104 can detect traffic accidents at the geographic location. In response to detecting a traffic accident, the system 100 and/or traffic signal 104 can notify emergency personnel/responders of such (e.g., dial 9-1-1, wireless and/or wired communication, etc., among other notification methods that are possible and contemplated herein). In additional or alternative embodiments, the system 100 and/or traffic signal 104 can take a video and/or photo of the accident and transmit such to the emergency personnel/responders.

While the various embodiments and examples have been made with reference to a roadway intersection and roadway vehicles, the various embodiments of the invention are not limited to such. That is, the spirit and scope of the present invention can be extended and/or modified to include railways and railway vehicles, airports/airways and aircraft, and waterways and marine vehicles, and any intersections and/or cross-intersections of such geographic locations, vehicles, and/or pedestrians.

In one non-limiting example, various embodiments contemplate the intersection and/or cross-intersection of aircraft, roadway vehicles, and/or pedestrians at an airport (e.g., runway, taxiway, terminal, etc.). In another non-limiting example, various embodiments contemplate the intersection and/or cross-intersection of railway vehicles, roadway vehicles, and/or pedestrians at a railroad crossing, which can include the intersection of a roadway and railway and their respective vehicles (and pedestrians). In yet another non-limiting example, various embodiments contemplate the intersection and/or cross-intersection of marine vehicles, roadway vehicles, and/or pedestrians at a drawbridge, which can include the intersection of a roadway and waterway and their respective vehicles (and pedestrians).

Figure 4:
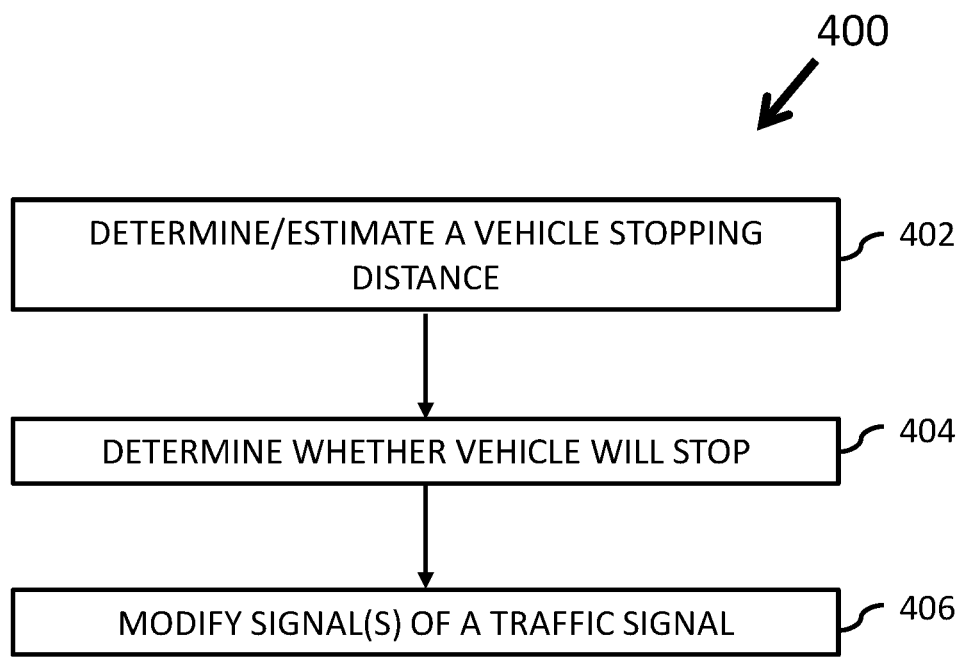
FIG. 4 is a flow diagram of one embodiment of a method for providing a smart traffic signal.

With reference now to FIG. 4, FIG. 4 is a flow diagram of one embodiment of a method 400 for providing a smart traffic signal. At least in the illustrated embodiment, method 400 can begin by a processor determining/estimating a stopping distance for a vehicle approaching a geographic location (block 402). The stopping distance can be determined and/or estimated using any of the systems, technologies, and/or techniques discussed elsewhere herein.

In response to determining the stopping distance, the processor can determine whether the vehicle will stop prior to reaching the geographic location (block 404). A determination of whether the vehicle will stop prior to reaching the geographic location can be determined using any of the systems, technologies, and/or techniques discussed elsewhere herein.

In response to determining that the vehicle will not stop prior to reaching the geographic location, the processor can modify one or more signals of a traffic signal 106 (e.g., a smart traffic signal) located at the geographic location (block 406). The signal can be modified in any manner discussed elsewhere herein. Further, the signal can be modified using any of the systems, technologies, and/or techniques discussed elsewhere herein.

Figure 5:
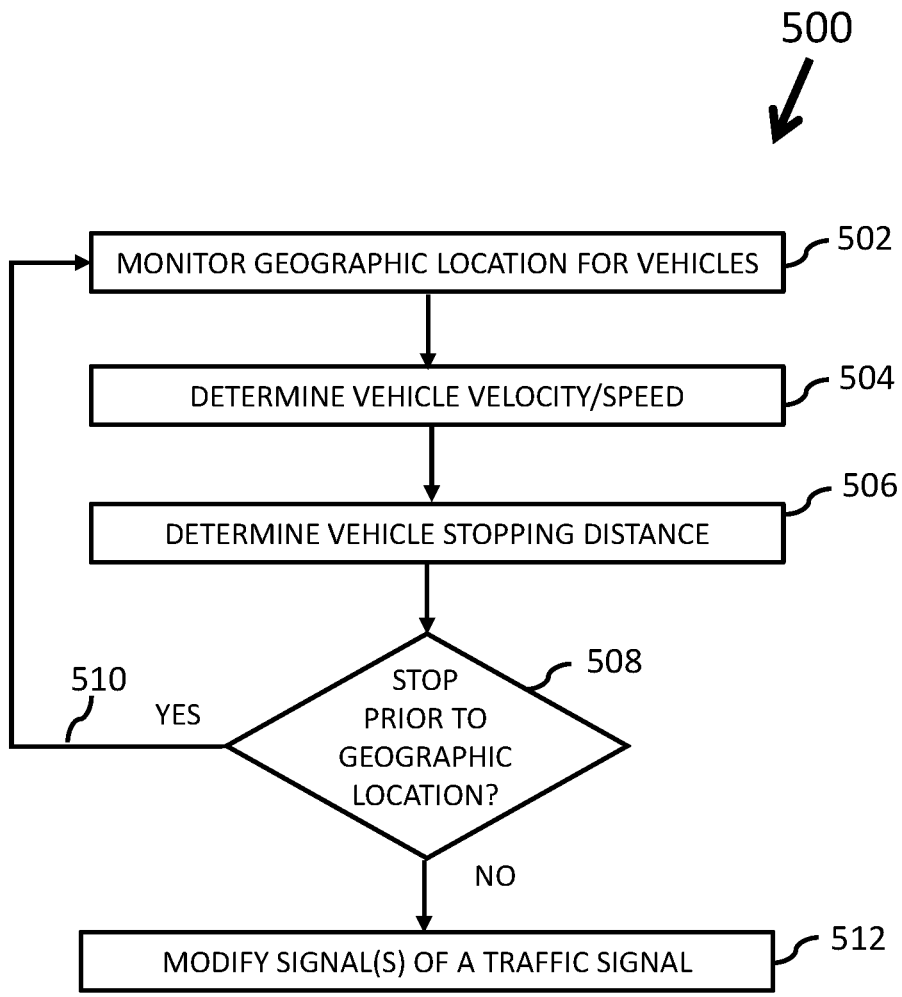
FIG. 5 is a flow diagram of another embodiment of a method for providing a smart traffic signal.

Referring now to FIG. 5, FIG. 5 is a flow diagram of another embodiment of a method 500 for providing a smart traffic signal. At least in the illustrated embodiment, the method 500 can begin by a processor monitoring a geographic location for the presence of one or more vehicles approaching the geographic location (block 502). The geographic location can be monitored using any of the systems, technologies, and/or techniques discussed elsewhere herein.

In response to the processor detecting a vehicle, the processor can determine a velocity/speed at which the vehicle is approaching the geographic location (block 504). The velocity/speed can be determined using any of the systems, technologies, and/or techniques discussed elsewhere herein.

In response to detecting/determining the velocity/speed of the vehicle, the processor can determine a stopping distance for a vehicle (block 506). The stopping distance can be determined and/or estimated using any of the systems, technologies, and/or techniques discussed elsewhere herein.

The processor can determine whether the vehicle will stop and/or is able to stop prior to reaching a geographic location (block 508). In response to the vehicle being able to stop prior to reaching the geographic location (e.g., a YES in block 508), the processor returns to and/or continues monitoring the geographic location in block 502 (return 510).

In response to the vehicle not being able to stop prior to reaching the geographic location (e.g., a NO in block 508), the processor can modify one or more signals of a traffic signal 106 located at the geographic location (block 512). The signal can be modified in any manner discussed elsewhere herein, including one or more signals for one or more vehicles and/or one or more signals for one or more pedestrians. Further, the signal can be modified using any of the systems, technologies, and/or techniques discussed elsewhere herein.

Figure 6:
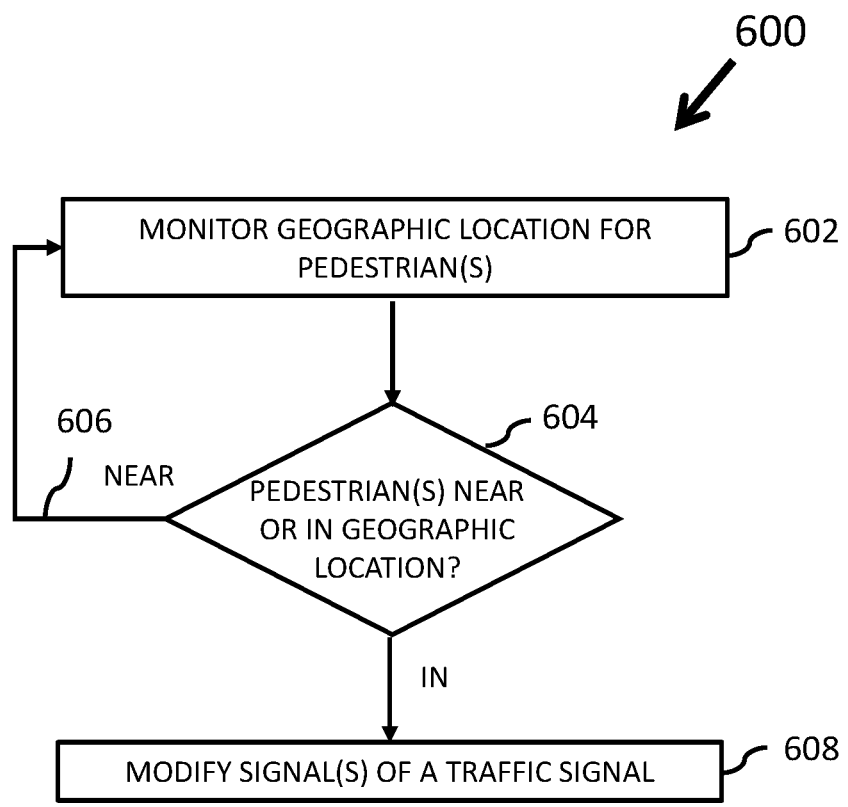
FIG. 6 is a flow diagram of yet another embodiment of a method for providing a smart traffic signal.

With reference to FIG. 6, FIG. 6 is a flow diagram of yet another embodiment of a method 600 for providing a smart traffic signal. At least in the illustrated embodiment, the method 600 can begin by a processor monitoring a geographic location for the presence of one or more pedestrians at the geographic location (block 602). The geographic location can be monitored using any of the systems, technologies, and/or techniques discussed elsewhere herein.

In response to the processor detecting the pedestrian(s), the processor can determine if the pedestrians are near or in the geographic location (block 604). For example, the processor can determine whether the pedestrian(s) is/are on a sidewalk and/or in a crosswalk of a roadway intersection.

In response to the pedestrian(s) being near the geographic location (e.g., NEAR in block 604), the processor returns to and/or continues monitoring the geographic location in block 602 (return 606). In response to the pedestrian(s) being in the geographic location (e.g., IN in block 604), the processor can modify one or more signals of a traffic signal 106 located at the geographic location (block 608). The signal can be modified in any manner discussed elsewhere herein, including, for example one or more signals for one or more vehicles being a stop visual cue (e.g., red light) and/or auditory cue or all signals for vehicles at the geographic location being stop visual cues and/or auditory cues. Further, the signal can be modified using any of the systems, technologies, and/or techniques discussed elsewhere herein.

Figure 7:
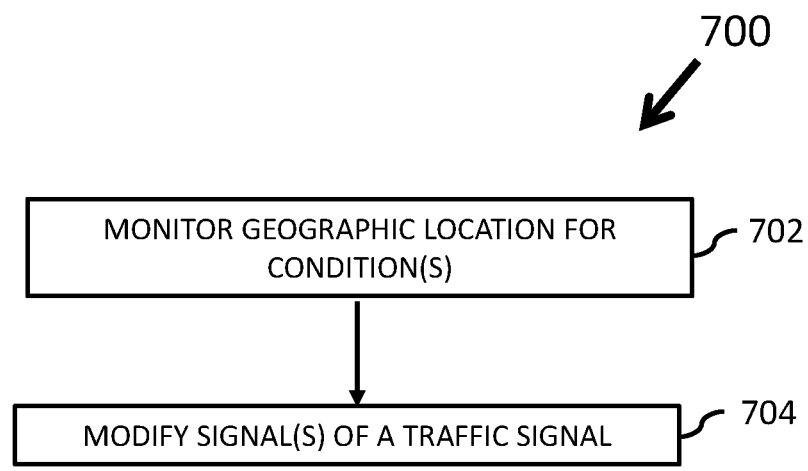
FIG. 7 is a flow diagram of still another embodiment of a method for providing a smart traffic signal.

Referring to FIG. 7, FIG. 7 is a flow diagram of yet another embodiment of a method 700 for providing a smart traffic signal. At least in the illustrated embodiment, the method 700 can begin by a processor monitoring a geographic location for one or more conditions that can affect (e.g., increase) the stopping distance of a vehicle (block 702). The condition(s) may include one or more weather conditions and/or one or more surface conditions, as discussed elsewhere herein. Further, the geographic location can be monitored for the weather condition(s) and/or surface condition(s) using any of the systems, technologies, and/or techniques discussed elsewhere herein.

In response to the processor detecting the condition(s), the processor can modify one or more signals of a traffic signal 106 located at the geographic location (block 704). The signal can be modified in any manner discussed elsewhere herein, including, for example one or more stop signals (e.g., red light) for one or more vehicles being increased and/or delayed. Further, the signal can be modified using any of the systems, technologies, and/or techniques discussed elsewhere herein.

The embodiments discussed in the above examples may provide several advantages and/or improvements over conventional traffic signals and/or techniques. For instance, the various embodiments can actively prevent and/or reduce the number of accidents encountered by vehicles, especially roadway vehicles at an intersection. While some advantages are identified and discussed herein, the various embodiments are limited to such advantages and/or improvements, but rather, the various embodiments contemplate all of the possible advantages and/or improvements that can be provided by the various embodiments.

The embodiments may be practiced in other specific forms. The described embodiments are to be considered in all respects only as illustrative and not restrictive. The scope of the technology is, therefore, indicated by the appended claims rather than by the foregoing description. All changes that come within the meaning and range of equivalency of the claims are to be embraced within their scope.

What is claim is:

1. A system, comprising:
 a stopping distance module that determines a stopping distance for a first vehicle approaching a geographic location, wherein:
  the stopping distance module comprises a lookup table including a grid of stopping distances based on velocities for a plurality of vehicles including at least one of a make, a model, and a year for each of the plurality of vehicles, and
  the stopping distance is determined based on cross-referencing the at least one of the make, the model, and the year of the first vehicle and a current velocity of the first vehicle on the grid;
 a determination module that, in response to determining the stopping distance, determines whether the first vehicle will stop prior to reaching the geographic location; and
 a signal module that, in response to determining that the first vehicle will not stop prior to reaching the geographic location, modifies a signal of a traffic light located at the geographic location,
 wherein at least a portion of said modules comprises one or more of a set of hardware circuits, a set of programmable hardware devices, and executable code stored on a set of non-transitory computer-readable storage media.

2. The system of claim 1, wherein:
 the stopping distance module comprises a velocity module that detects the current velocity of the first vehicle; and
 the stopping distance is determined based on the current velocity.

3. The system of claim 1, wherein:
 the stopping distance module comprises:
  a velocity module that detects the current velocity of the first vehicle, and
  an identification module that identifies a vehicle type for the first vehicle; and
 the stopping distance is determined based on the current velocity and the vehicle type.

4. The system of claim 3, wherein:
 the identification module further identifies the at least one of the make, the model, and the year of the first vehicle; and
 the stopping distance is further determined based on the at least one of the make, the model, and the year of the first vehicle.

5. The system of claim 3, further comprising at least one of:
 a weather condition system that detects a weather condition; and
 a surface condition system that detects a surface condition at the geographic location,
 wherein the stopping distance is further determined based on the at least one of the weather condition and the surface condition.

6. The system of claim 1, further comprising at least one of:
 a weather condition system that detects a weather condition; and
 a surface condition system that detects a surface condition at the geographic location,
 wherein the stopping distance is further determined based on the at least one of the weather condition and the surface condition.

7. The system of claim 1, wherein the signal module modifies the signal to at least one of increase a stop light for a second vehicle oriented in a different direction than the first vehicle at the geographic location and increase a go light for the first vehicle in response to determining that the first vehicle will not stop prior to reaching the geographic location.

8. The system of claim 1, wherein the signal module modifies the signal to provide a first warning to a second vehicle at the geographic location in response to determining that the first vehicle will not stop prior to reaching the geographic location.

9. The system of claim 8, wherein the signal module modifies the signal to provide a second warning to the second vehicle in further response to determining that the first vehicle will not stop prior to reaching the geographic location.

10. The system of claim 1, wherein the signal module modifies the signal to indicate to a second vehicle oriented in a different direction than the first vehicle at the geographic location to one of stop and accelerate in response to determining that the first vehicle will not stop prior to reaching the geographic location.

11. A method, comprising:
 determining, by a processor, a stopping distance for a first vehicle approaching a geographic location,
  the stopping distance determined by:
   utilizing a lookup table including a grid of stopping distances based on velocities for a plurality of vehicles including at least one of a make, a model, and a year for each of the plurality of vehicles, and
   cross-referencing the at least one of the make, the model, and the year of the first vehicle and a current velocity of the first vehicle on the grid;
 in response to determining the stopping distance, determining whether the first vehicle will stop prior to reaching the geographic location; and
 in response to determining that the first vehicle will not stop prior to reaching the geographic location, modifying a signal of a traffic light located at the geographic location.

12. The method of claim 11, wherein determining the stopping distance comprises:
 detecting the current velocity of the first vehicle; and
 identifying the at least one of the make, the model, and the year for the first vehicle.

13. The method of claim 11, wherein determining the stopping distance comprises:
 detecting the current velocity of the first vehicle; and
 detecting at least one of a weather condition and a road condition at the geographic location,
 wherein the stopping distance is further determined based on the at least one of the weather condition and the road condition.

14. The method of claim 11, wherein, in response to determining that the first vehicle will not stop prior to reaching the geographic location, modifying the signal comprises at least one of:
 increasing a stop time for a stop light for a second vehicle oriented in a different direction than the first vehicle at the geographic location;
 increasing a go time go light for the first vehicle;
 providing a warning to the second vehicle; and
 providing a warning to a pedestrian at the geographic location.

15. The method of claim 11, wherein modifying the signal comprises:
 providing a first warning to a second vehicle at the geographic location in response to determining that the first vehicle will not stop prior to reaching the geographic location; and
 providing a second warning to the second vehicle in further response to determining that the first vehicle will not stop prior to reaching the geographic location.

16. A computer program product comprising a computer-readable storage medium including program instructions embodied therewith, the program instructions executable by a processor to cause the processor to:
 determine a stopping distance for a first vehicle approaching a geographic location,
  the stopping distance determined by:
   utilizing a lookup table including a grid of stopping distances based on velocities for a plurality of vehicles including at least one of a make, a model, and a year for each of the plurality of vehicles, and
   cross-referencing the at least one of the make, the model, and the year of the first vehicle and a current velocity of the first vehicle on the grid;
 in response to determining the stopping distance, determine whether the first vehicle will stop prior to reaching the geographic location; and
 in response to determining that the first vehicle will not stop prior to reaching the geographic location, modify a signal of a traffic light located at the geographic location.

17. The computer program product of claim 16, wherein the program instructions that cause the processor to determine the stopping distance further comprise program instructions that cause the processor to:
 detect the current velocity of the first vehicle; and
 identify the at least one of the make, the model, and the year for the first vehicle.

18. The computer program product of claim 16, wherein the program instructions that cause the processor to determine the stopping distance further comprise program instructions that cause the processor to:
 detect the current velocity of the first vehicle; and
 detect at least one of a weather condition and a road condition at the geographic location,
 wherein the stopping distance is further determined based on the at least one of the weather condition and the road condition.

19. The computer program product of claim 16, wherein the program instructions that cause the processor to modify the signal further comprise program instructions that cause the processor to at least one of:
 increase a stop time for a stop light for a second vehicle oriented in a different direction than the first vehicle at the geographic location;
 increase a go time go light for the first vehicle;
 provide a warning to the second vehicle; and
 provide a warning to a pedestrian at the geographic location.

20. The computer program product of claim 16, wherein modifying the signal comprises:
 providing a first warning to a second vehicle at the geographic location in response to determining that the first vehicle will not stop prior to reaching the geographic location; and
 providing a second warning to the second vehicle in further response to determining that the first vehicle will not stop prior to reaching the geographic location.

* * * * *